United States Patent
Dixon et al.

(10) Patent No.: US 7,085,815 B2
(45) Date of Patent: Aug. 1, 2006

(54) SCALABLE MEMORY MANAGEMENT OF TOKEN STATE FOR DISTRIBUTED LOCK MANAGERS

(75) Inventors: Brian P. Dixon, Austin, TX (US); Marc M. Eshel, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 09/907,423

(22) Filed: Jul. 17, 2001

(65) Prior Publication Data

US 2003/0018782 A1    Jan. 23, 2003

(51) Int. Cl.
*G06F 15/167* (2006.01)
*G06F 15/173* (2006.01)
*G06F 7/00* (2006.01)
*G06F 12/00* (2006.01)

(52) U.S. Cl. ............ 709/213; 709/214; 709/225; 707/8; 711/147

(58) Field of Classification Search ............ 707/8; 709/213, 214, 225, 226; 711/147
See application file for complete search history.

(56) References Cited

U.S. PATENT DOCUMENTS

| | | | |
|---|---|---|---|
| 5,193,190 A | 3/1993 | Janczyn et al. | 395/700 |
| 5,454,091 A | 9/1995 | Sites et al. | 395/413 |
| 5,454,108 A | 9/1995 | Devarakonda et al. | 395/650 |
| 5,459,854 A | 10/1995 | Sherer et al. | 395/500 |
| 5,696,971 A | 12/1997 | Masih | 395/700 |
| 5,806,065 A * | 9/1998 | Lomet | 707/8 |
| 5,835,104 A | 11/1998 | Hicok et al. | 345/509 |
| 5,937,088 A | 8/1999 | Hsu | 382/167 |
| 5,940,841 A | 8/1999 | Schmuck et al. | 707/205 |
| 5,950,199 A * | 9/1999 | Schmuck et al. | 707/8 |
| 5,987,477 A | 11/1999 | Schmuck et al. | 707/201 |
| 5,999,976 A * | 12/1999 | Schmuck et al. | 709/226 |
| 6,032,216 A | 2/2000 | Schmuck et al. | 710/200 |
| 6,128,279 A * | 10/2000 | O'Neil et al. | 370/229 |

\* cited by examiner

*Primary Examiner*—Jason Cardone
*Assistant Examiner*—Tanim Hossain
(74) *Attorney, Agent, or Firm*—Kevin M. Jordan, Esq.; Kevin P. Radigan, Esq.; Heslin Rothenberg Farley & Mesiti, P.C.

(57) ABSTRACT

The amount of memory being utilized to store token state information is monitored. In response to the monitoring, one or more actions are taken. For instance, if the monitoring indicates that too much memory is being used to store token state information, then one or more actions are performed to reclaim memory and/or obtain additional memory elsewhere. These actions may include informing one or more clients to reduce their cache sizes, thereby relinquishing tokens; reducing or eliminating one or more byte range token trees; and/or migrating the token server from one node to another node. If the monitoring indicates that additional memory can be used for storing token state information, then one or more client nodes are informed that their cache sizes can be increased.

66 Claims, 7 Drawing Sheets

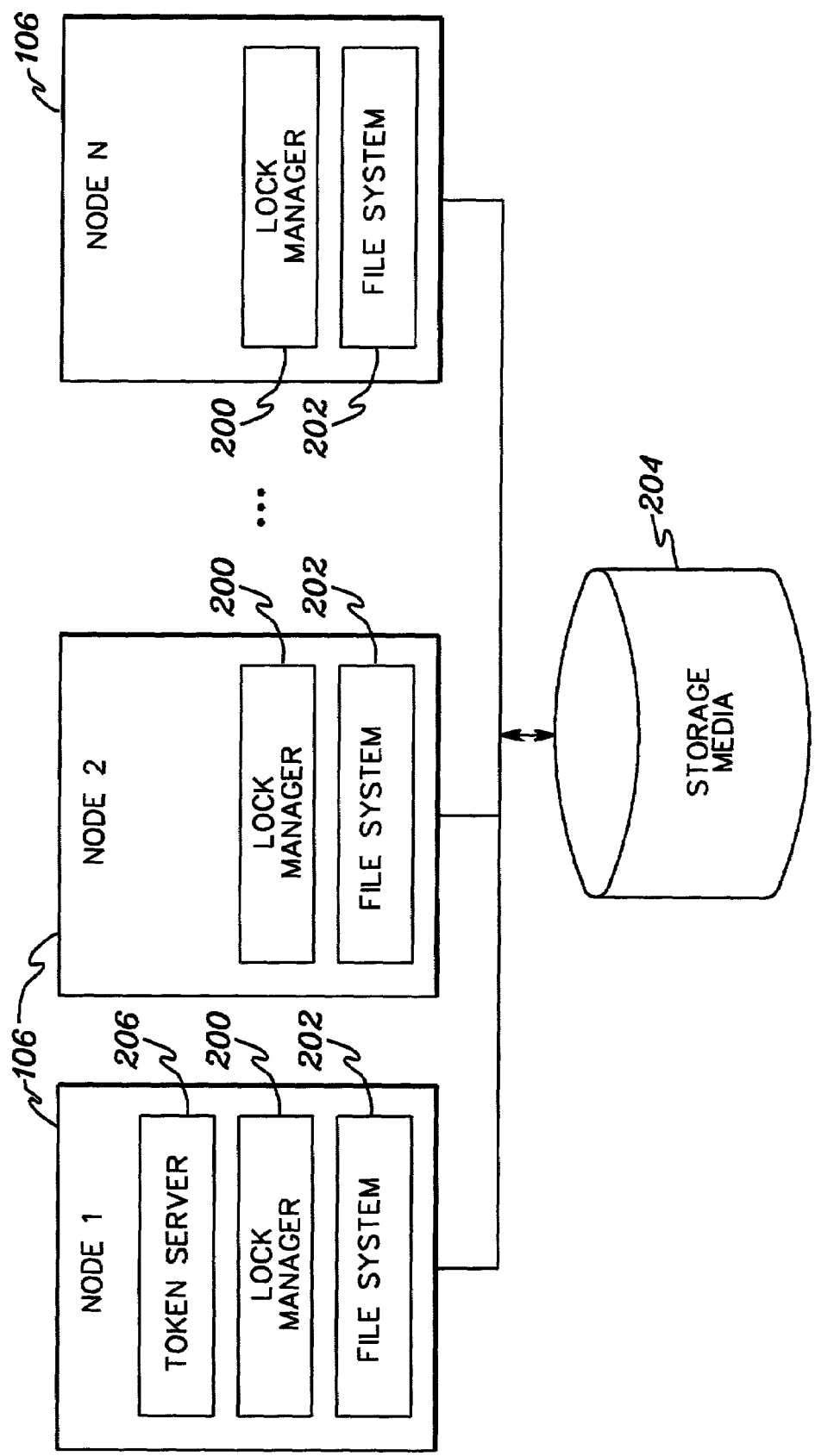

SCALABLE MEMORY MANAGEMENT OF TOKEN STATE FOR DISTRIBUTED LOCK MANAGERS

CROSS-REFERENCE TO RELATED PATENTS

This application contains subject matter which is related to the subject matter of the following patents, each of which is assigned to the same assignee as this application. Each of the below listed patents is hereby incorporated herein by reference in its entirety:

"DISTRIBUTED LOCK MANAGER USING A PASSIVE, STATE-FULL CONTROL-SERVER", by Devarakonda et al., U.S. Pat. No. 5,454,108, issued Sep. 26, 1995;

"PARALLEL FILE SYSTEM WITH EXTENDED FILE ATTRIBUTES", by Schmuck et al., U.S. Pat. No. 5,940,841, issued Aug. 17, 1999;

"PARALLEL FILE SYSTEM AND METHOD FOR GRANTING BYTE RANGE TOKENS", by Schmuck et al., U.S. Pat. No. 5,950,199, issued Sep. 7, 1999;

"PARALLEL FILE SYSTEM AND METHOD FOR PARALLEL WRITE SHARING", by Schmuck et al., U.S. Pat. No. 5,987,477, issued Nov. 16, 1999;

"PARALLEL FILE SYSTEM AND METHOD WITH BYTE RANGE API LOCKING", by Schmuck et al., U.S. Pat. No. 5,999,976, issued Dec. 7, 1999; and "PARALLEL FILE SYSTEM WITH METHOD USING TOKENS FOR LOCKING MODES", by Schmuck et al., U.S. Pat. No. 6,032,216, issued Feb. 29, 2000.

TECHNICAL FIELD

This invention relates, in general, to memory management, and in particular, to managing the amount of memory used to store token state information for distributed lock managers.

BACKGROUND OF THE INVENTION

In a distributed communications environment, resources may be shared among a plurality of the nodes of the distributed environment. In order to coordinate access to the shared resources, a distributed lock manager is used. In one example, the distributed lock manager includes a layer of software that runs on each of the nodes of the environment.

The distributed lock manager uses at least one locking protocol to coordinate access to the shared resources. In one example, the locking protocol is a token-based protocol in which the distributed lock manager interfaces with a token server to obtain tokens, and then grants lock requests based on the granted tokens.

For example, when an application requests a lock of a resource, the local lock manager of the node in which the application is executing sends a request to the token server to acquire a corresponding token for the resource. Once the token is acquired, the lock manager grants the requested lock. When the lock is released, the node retains the token so that subsequent lock requests for the same object can be granted locally without requiring additional messages to the token server. The token server keeps track of which tokens are held by which nodes.

When the token server receives a request from a node for a token that is currently held by another node, the other node needs to relinquish its token before it can be granted to the requesting node. This is accomplished by having the lock manager of the requesting node send a revoke request to the node holding the token. In response to the revoke request, the node checks whether a lock requiring the token is currently held, waits for any such lock to be released, and then sends a message to the token server to relinquish the token.

The token server keeps full state of the tokens for each client. This is described in, for instance, U.S. Pat. No. 5,454,108, entitled "Distributed Lock Manager Using A Passive, State-Full Control-Server", issued on Sep. 26, 1995, which is hereby incorporated herein by reference in its entirety. Although the server keeps full state for each client, the server has no way to communicate back to the client to control the size of the state that each client consumes. That is, the server is passive in that it will not initiate communication to a client to control the size of the token cache. Thus, the token server can run out of memory. When this happens, the token server stops granting tokens. This is especially problematic for byte range tokens, which are kept in a balanced tree, which consumes a great deal of memory when used even with one very large file.

Thus, a need exists for a token server that takes an active role in monitoring its memory usage. A further need exists for a capability that enables the token server to take action based on that monitoring.

SUMMARY OF THE INVENTION

The shortcomings of the prior art are overcome and additional advantages are provided through the provision of a method of managing memory utilized in storing token state information. The method includes, for instance, monitoring usage of memory utilized in storing token state information associated with one or more tokens managed by a token server of a communications environment; and performing at least one action in response to the monitoring.

In one example, the performing at least one action includes performing one or more of the following actions: having one or more clients relinquish one or more tokens, in response to an indication that non-range tokens are utilizing more of the memory than desired; revoking one or more range tokens, in response to an indication that range tokens are utilizing more of the memory than desired; and migrating the token server from a node of the communications environment to another node of the communications environment, in response to an indication that even after the relinquishing and the revoking more available memory is desired.

In a further example, the performing at least one action includes informing one or more clients that additional memory is available to store token state information.

System and computer program products corresponding to the above-summarized methods are also described and claimed herein.

Advantageously, the capabilities of the present invention enable a token server to monitor usage of its memory and to take action based on the monitoring. This allows the token server to actively control the amount of memory used to store token state information and to avoid running out of memory.

Additional features and advantages are realized through the techniques of the present invention. Other embodiments and aspects of the invention are described in detail herein and are considered a part of the claimed invention.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2 depicts further details of a plurality of nodes of the communications environment of FIG. 1, in accordance with an aspect of the present invention;

BEST MODE FOR CARRYING OUT THE INVENTION

In accordance with an aspect of the present invention, a token server monitors the amount of memory used to store token state information, and takes action based on that monitoring. For example, if the monitoring indicates that too much memory is being utilized to store token state information, then one or more actions are taken to reduce the size of the memory that the token state uses and/or to obtain additional memory. As a further example, should the monitoring indicate that additional memory can be utilized for the token state information, then one or more actions are taken, in response to that indication.

Figure 1:
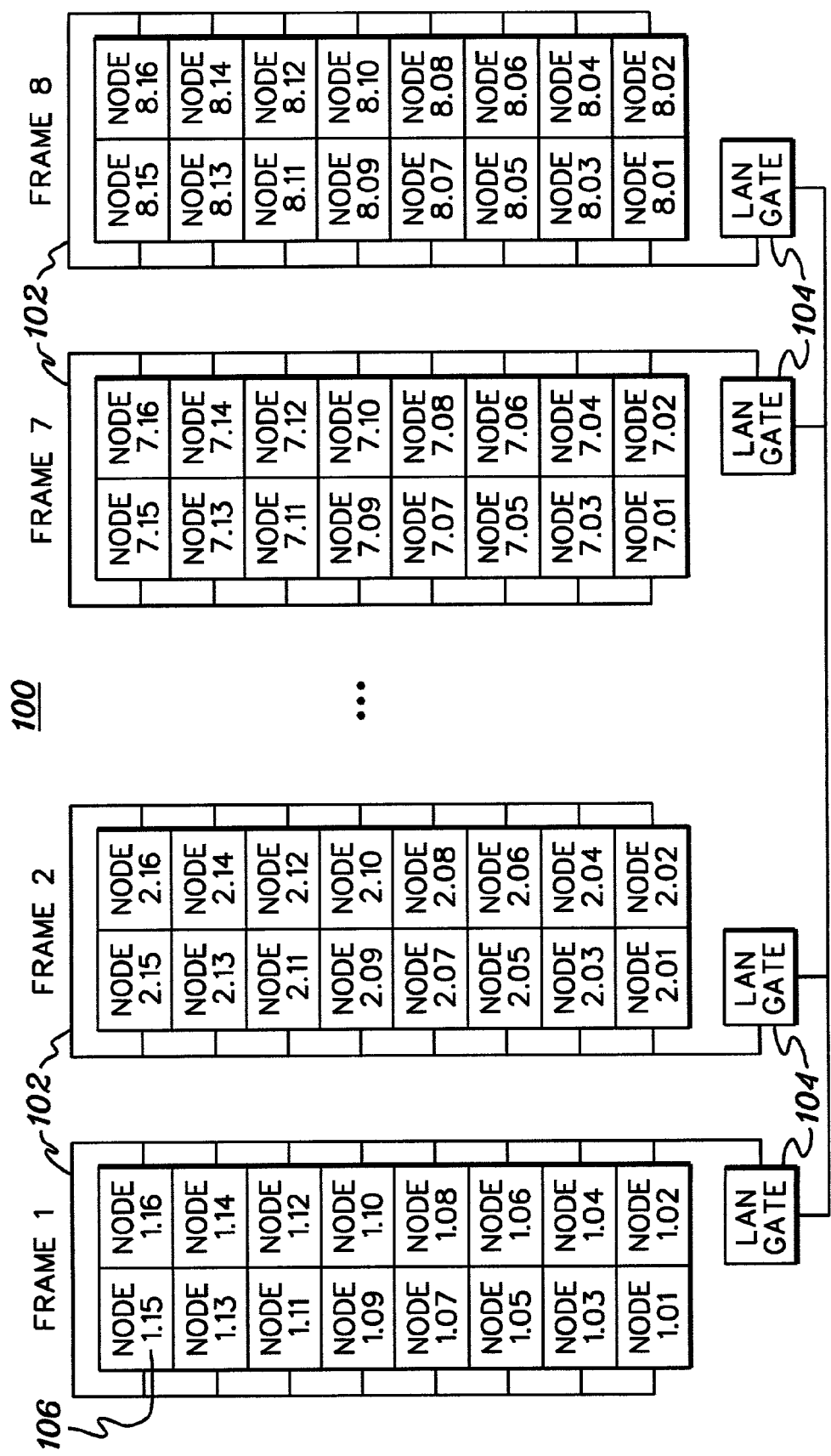
FIG. 1 depicts one embodiment of a communications environment incorporating and using one or more aspects of the present invention.

One embodiment of a communications environment incorporating and using aspects of the present invention is depicted in FIG. 1. As one example, the communications environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a RISC/6000 computer running AIX, a Unix based operating system. Each processing node within a frame is coupled to the other processing nodes of the frame via, for example, at least one internal LAN connection. Additionally, each frame is coupled to the other frames via LAN gates 104.

As examples, each LAN gate 104 includes either a RISC/6000 computer, any computer network connection to the LAN or a network router. However, these are only examples. It will be apparent to those skilled in the relevant art that there are other types of LAN gates and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. Further, aspects of the invention are useful with other types of communications environments. All of the these variations are considered a part of the claimed invention.

In one example, distributed across a plurality of the processing nodes of distributed computing environment 100 is a distributed lock manager 200 (FIG. 2). The distributed lock manager is responsible for coordinating access to shared resources among a set of networked processing nodes or computer systems. In particular, applications running on the processing nodes send locking requests to their local lock manager to access the shared resources. One such application is a distributed file system 202 (such as the General Parallel File System (GPFS) offered by International Business Machines Corporation). GPFS uses locking to coordinate updates to shared files stored on one more storage media 204 (e.g., disks) coupled to the nodes.

In one example, the distributed lock manager is a token-based lock manager that uses tokens to coordinate access to the shared resources. The use of the tokens is coordinated by a service executing on at least one node. This service is referred to as a token server 206.

The token server is responsible for granting tokens requested by nodes and for taking back tokens held by one or more nodes, where those nodes no longer need the tokens or the tokens are needed by other nodes. The token server keeps track of the tokens held by the various nodes.

Figure 3A:
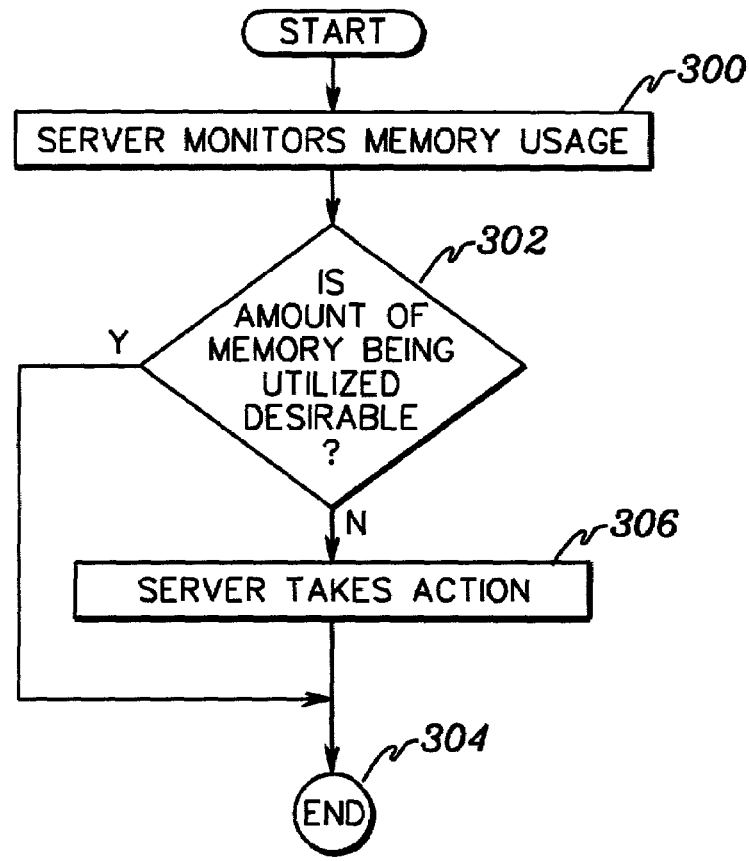
FIG. 3a depicts one embodiment of an overview of the logic associated with monitoring usage of the memory utilized to store token state information, in accordance with an aspect of the present invention.

Further, in accordance with an aspect of the present invention, the token server monitors usage of memory utilized to store state information associated with the one or more tokens managed by the token server, and it takes action based on the monitoring. An overview of the logic associated with this monitoring is described with reference to FIG. 3a.

Periodically, the token server checks the amount of memory being utilized to store token state information associated with the one or more tokens being managed by the token server, STEP 300. As examples, the token server performs this check each time a request for a token is received by the token server; every X times a request is received; every Y (e.g., 5–10) seconds; and/or at other desired times.

Figure 3B:
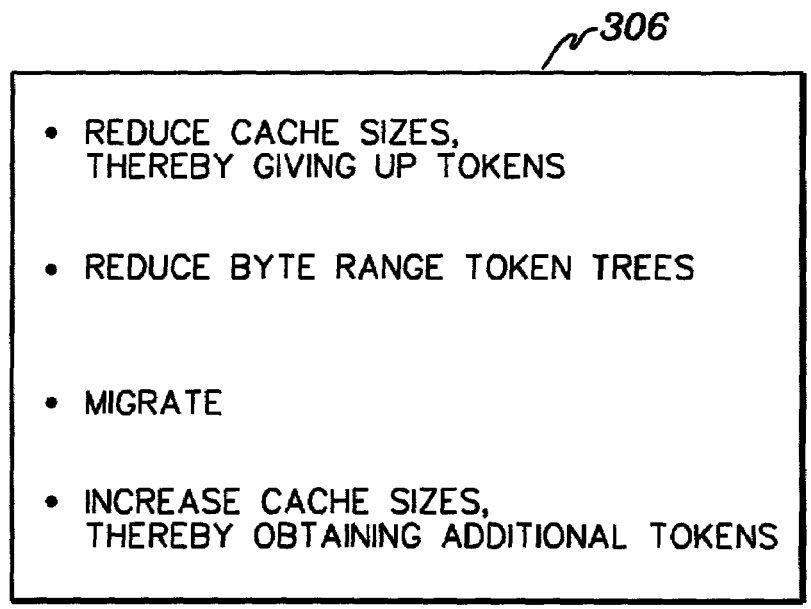
FIG. 3b depicts one embodiment of various actions that can be taken in response to the monitoring, in accordance with an aspect of the present invention.

Should it be determined that the amount of memory being utilized to store the token state information is at a desirable level, INQUIRY 302, then no action is taken at this time, STEP 304. However, if the amount of memory being utilized to store the token state information is at an undesirable level (e.g., too high or too low), then the server takes one or more appropriate actions, STEP 306. The one or more actions to be taken are based on, for instance, whether the memory level is high or low and the type of tokens being stored. Examples of the one or more actions that the server may take are described with reference to FIG. 3b.

For instance, if the token server has determined that too much memory is being utilized, then the token server may request that one or more clients voluntarily give up one or more tokens, which reduces the state that the server needs to keep; and/or the server may reduce the size of one or more large byte range state trees, which also reduces the state that the server maintains.

In one example, to voluntarily give up one or more tokens, one or more clients are requested to reduce the number of files they have cached. As a client removes a file from its cache, it relinquishes any associated tokens.

In addition to the above or in lieu of one or more of the above actions, should the token server determine that it needs more memory, then the token server can migrate itself to another node in the environment that has more memory for storing token state information. This can be performed without disturbing the continuous operation of lock management.

As a further example, should the token server determine that more memory is available for storing state information, then the token server may inform one or more of its clients to increase their cache sizes. As a client increases its cache by adding one or more files to the cache, the number of tokens held also increases, which utilizes more of the memory.

Figure 5A:
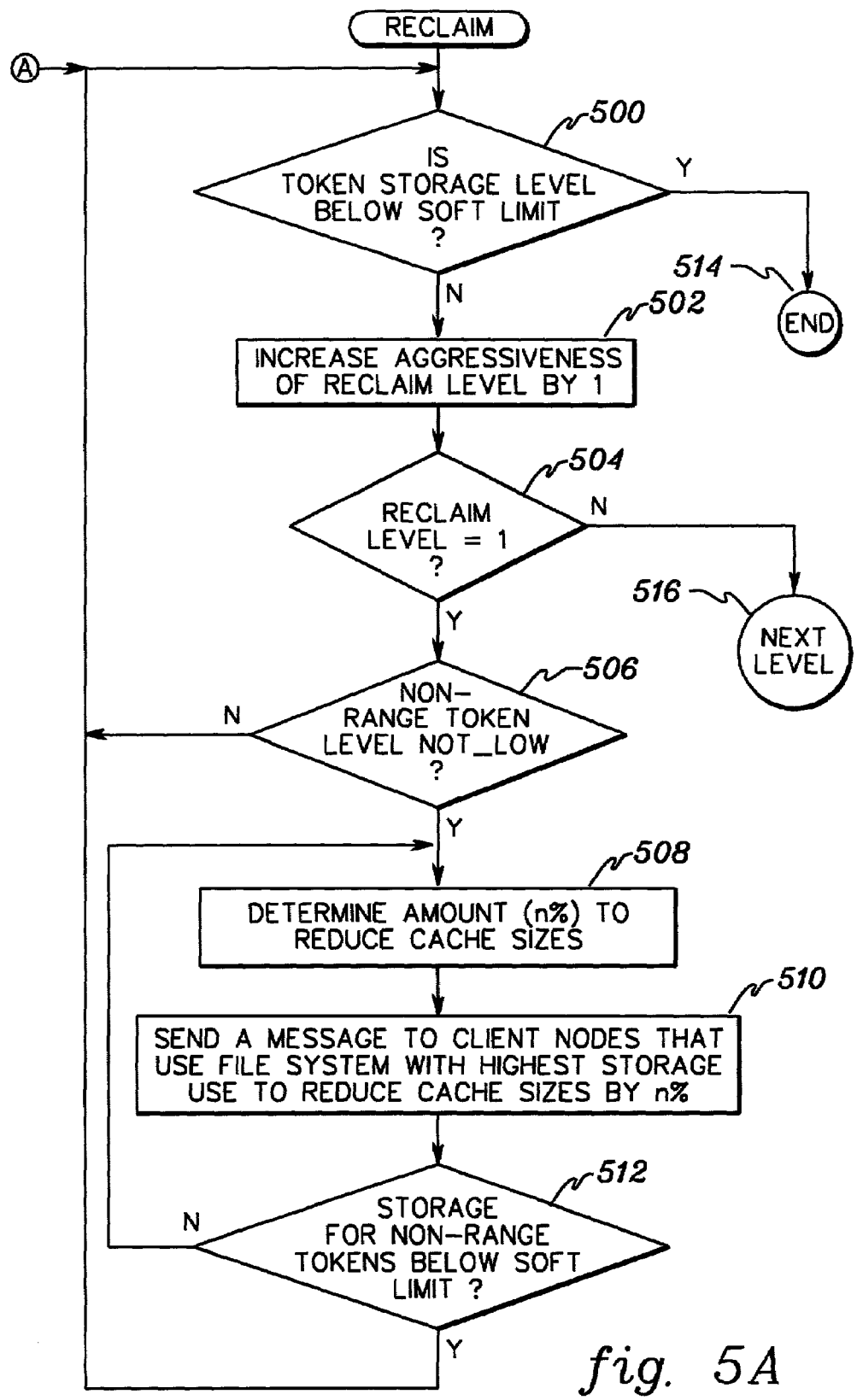
FIGS. 5a–5b depict one embodiment of the logic associated with performing one or more actions in response to the monitoring of FIG. 4, in accordance with an aspect of the present invention.
Figure 5B:
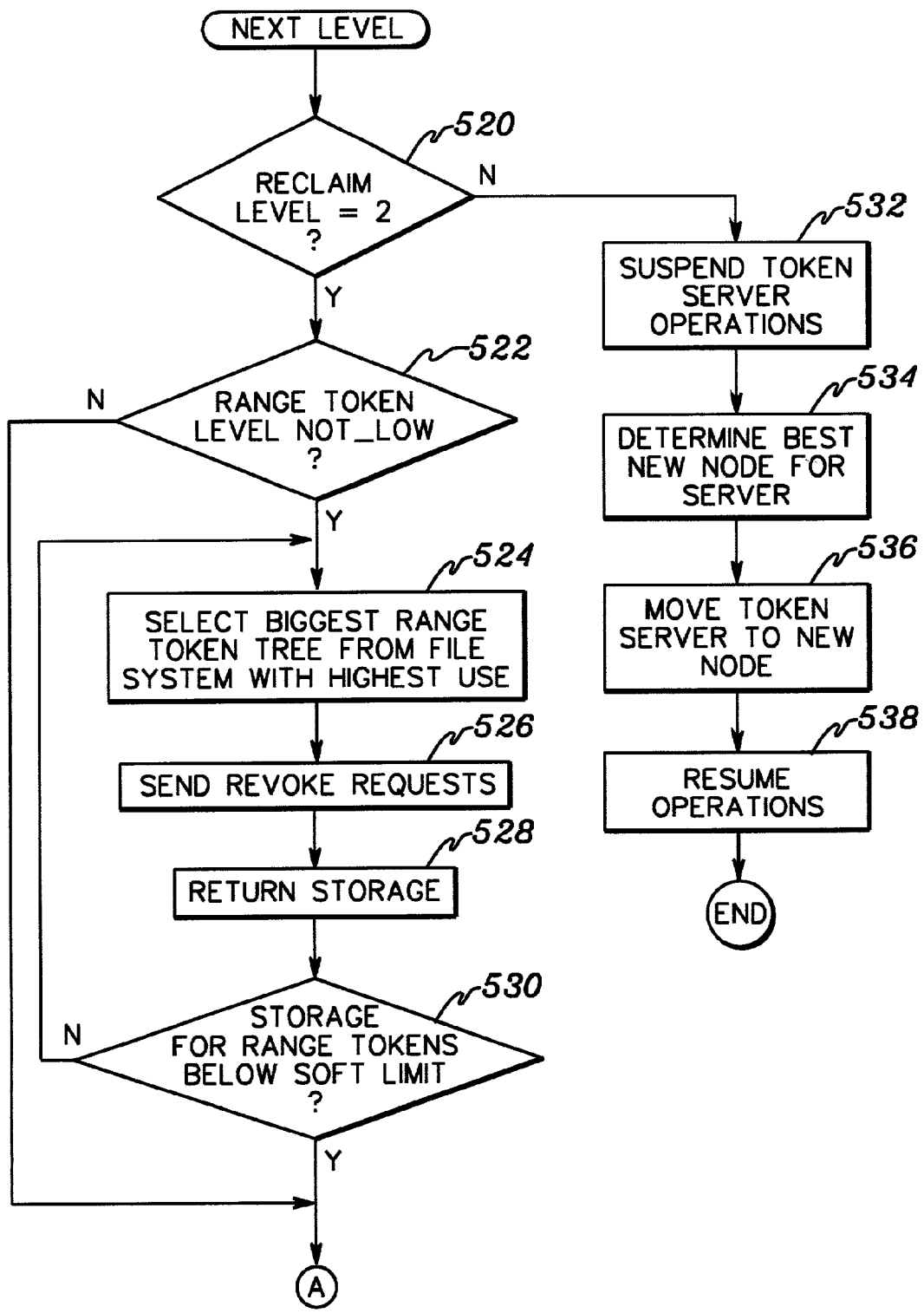
Figure 6:
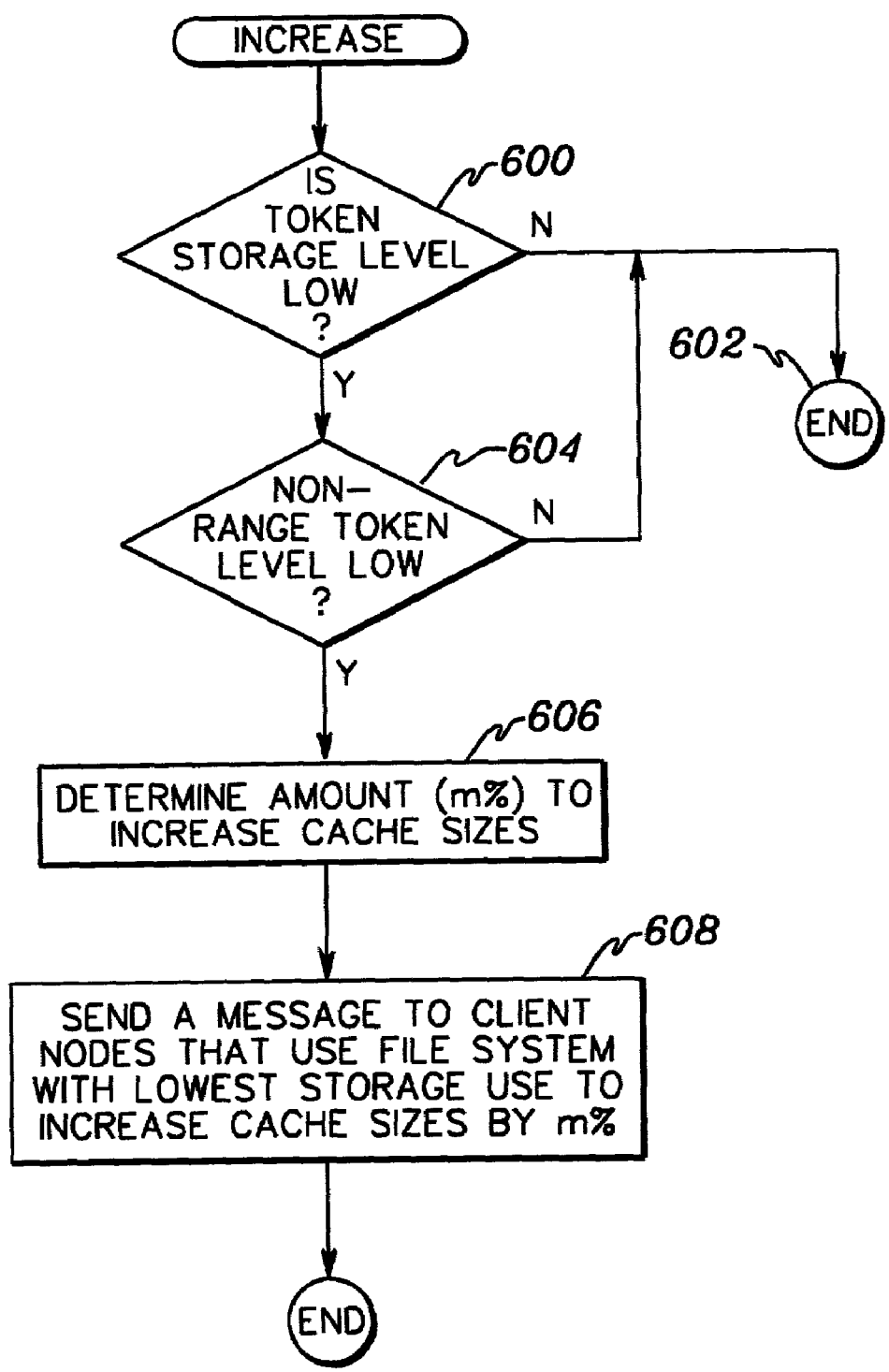
FIG. 6 depicts one embodiment of additional logic associated with performing one or more actions in response to the monitoring of FIG. 4, in accordance with an aspect of the present invention.

Further details regarding one embodiment of the memory management technique of an aspect of the present invention is described with reference to FIGS. 4, 5a–5b and 6. In particular, FIG. 4 describes one embodiment of the logic associated with monitoring storage levels; FIGS. 5a–5b depict one embodiment of the logic associated with taking one or more actions when the monitoring indicates that the amount of memory being utilized for storing token state information is too high; and FIG. 6 depicts one embodiment of the logic associated with taking one or more actions when the amount of memory being utilized for storing token state information is too low. The logic of FIGS. 4, 5a–5b and 6 is executed by, for instance, the token server.

Figure 4:
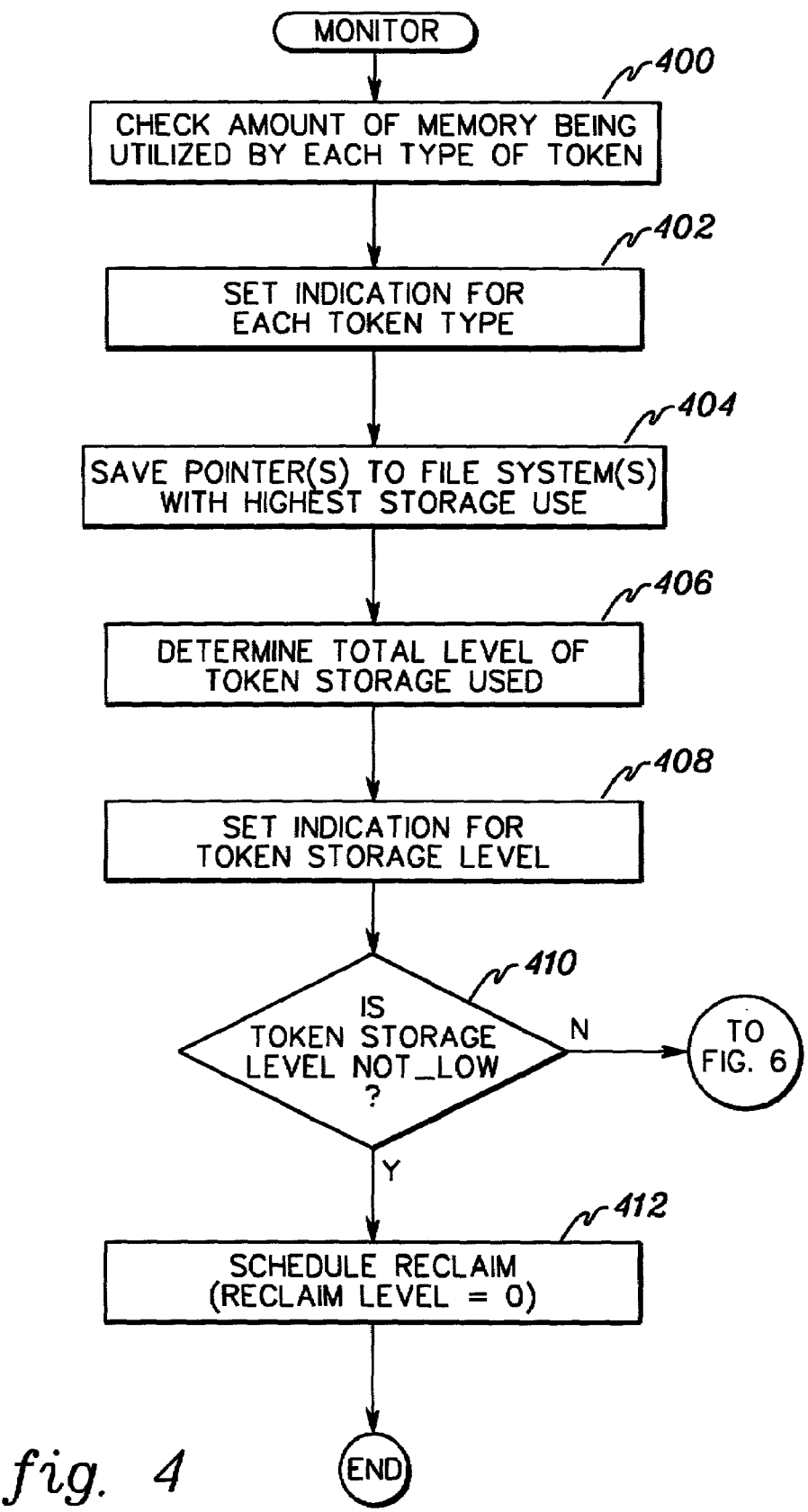
FIG. 4 depicts one embodiment of the logic associated with monitoring memory usage, in accordance with an aspect of the present invention.

Referring to FIG. 4, at periodic intervals, the token server checks one or more thresholds to determine whether the amount of memory being utilized to store token state information is at a desired level, STEP 400. As one example, a check is made of the amount of memory that is being used by each type of token (e.g., non-range tokens and range tokens). The amount of memory being used by the non-range tokens is determined, for instance, by checking a counter of the number of non-range tokens stored in the token server's memory and multiplying the value of that counter by the size of the tokens. As for the range tokens, the amount of storage being used is determined by calculating the size of each byte range token tree. That is, each tree has one or more nodes and each node of the tree is the same size. Thus, the size of the tree is calculated by multiplying the size of the node by the number of nodes in the tree.

Based on the determination of the amount of storage being used for each token type, an indication of LOW, COMFORTABLE, or NOT_LOW is set for each type, STEP 402. For example, if a certain percentage of the storage allocated for non-range tokens (e.g., 90%) is being used by the non-range tokens, then an indication of NOT_LOW is set for the non-range tokens. Likewise, if a certain percentage of the storage allocated for non-range tokens (e.g., less than 60%) is being used, then an indication of LOW is set for the non-range tokens. Otherwise, an indication of COMFORTABLE is set.

Similarly, if a certain percentage of storage allocated for range tokens (e.g., 90%) is being used by the range tokens, then an indication of NOT LOW is set for the range tokens. However, if a certain percentage of the storage allocated for range tokens (e.g., less than 60%) is being used, then an indication of LOW is set for the range tokens. Otherwise, an indication of COMFORTABLE is set for the range tokens.

In addition to setting an indication for each token type, pointers to the one or more file systems with the highest storage use are saved, STEP 404. That is, there may be multiple file systems serviced by the token server, each using a set of tokens. Thus, the amount of storage being used to store the token state for each file system is determined, and then an ordering is performed, which is based on the amount of storage used by each file system. In one example, the ordering is from highest to lowest. Pointer(s) to one or more file systems with the highest storage use (relatively) are saved. The number of file systems represented is discretionary. For example, a pointer to just the file system with the highest use may be saved, or as another example, pointers to the top three file systems may be saved, or any other number. As a further embodiment, pointer(s) can also be saved for the one or more file systems with the lowest storage use.

In addition to the above, a determination is also made as to the total level of token storage being used for storing token state information, STEP 406. In one example, this determination is made by summing the amount of storage used for the non-range tokens and the amount of storage used for the range tokens. Based on this determination, an indication is set to LOW, NOT_LOW or COMFORTABLE indicating the token storage level, STEP 408. For instance, if a certain percentage of the storage allocated for token state information (e.g., 90%) is being used to store the token state information, then the indication is set to NOT_LOW. Likewise, if a certain percentage of the storage allocated for token state information (e.g., less than 60%) is being used to store the token state information, then the indication is set to LOW. Otherwise, it is set to COMFORTABLE.

Thereafter, a determination is made as to the token storage level, INQUIRY 410. Should the token storage level be NOT_LOW, then action is taken to reclaim some of the storage and/or obtain additional storage, as described herein, STEP 412.

As one example, a thread separate from the monitoring thread, is awoken (with reclaim level set to 0) to drive the logic used to reclaim storage and/or obtain additional storage. Once started, this thread takes action based on the type of token and its associated storage level. One embodiment of the logic associated with reclaiming storage and/or obtaining additional storage is described with reference to FIGS. 5a–5b.

Referring to FIG. 5a, initially, a determination is made as to whether the token storage level is below a soft limit (e.g., 75% of allocated storage for token state information), INQUIRY 500. That is, in one aspect of the invention, once it is determined that the token storage level is too high, the reclaiming procedure is performed until the storage level is below the soft limit, instead of just below the NOT_LOW limit, so that the procedure is not executed too frequently.

Thus, if the token storage level is not below the soft limit, then the aggressiveness of the reclaim is increased, STEP 502. In one example, a reclaim level is used to control the aggressiveness of the reclaim. Thus, the reclaim level, which starts at zero, in this example, is increased by one.

Next, a determination is made as to the reclaim level, INQUIRY 504. Should the reclaim level be equal to one, then a determination is made as to whether the non-range token level is equal to NOT_LOW, INQUIRY 506. If the non-range token level is other than NOT_LOW, then the storage being utilized by the non-range tokens need not be reduced, so processing continues with INQUIRY 500.

However, if the non-range token level is NOT_LOW, then too much storage is being used to store non-range token state information. Thus, the amount of storage being utilized is to be reduced. In order to reduce the amount of storage, one or more selected caches are reduced in size by a chosen percentage. As files are removed from a cache to reduce the cache size, the number of tokens held is also decreased. Thus, the amount of storage being utilized to store the token state information is reduced.

In particular, in one embodiment, a determination is made as to how much each selected cache size is to be reduced, STEP 508. In one example, each selected cache size is reduced by 5% (i.e., n% is set to 5%). However, this is a configurable value, which need not be 5%. Further, the value can be different for each iteration of the logic.

After determining the amount to reduce cache sizes, a message is sent to one or more client nodes to reduce its cache size by the n%, STEP 510. In particular, in one embodiment, a message is sent to one or more client nodes that use the file system with the highest storage use to reduce their cache sizes by n%, STEP 510. As the selected clients remove items from their caches, tokens are returned and the space is made available.

Subsequently, a determination is made as to whether the storage used for non-range tokens is below a soft limit set for non-range tokens (e.g., 75%), INQUIRY 512. If the storage for non-range tokens is not below the soft limit, then processing continues with STEP 508. In this embodiment, the storage for the particular token type continues to be reduced until it is below the soft limit, in order to prevent the procedure from repeating too frequently.

In different embodiments, when continuing at STEP 508, n% may be increased further; or it may be left at the current level and applied to one or more file systems with a high (not necessarily just the highest) storage use. Other possibilities also exist and are considered a part of the claimed invention.

Returning to INQUIRY 512, when the storage for non-range tokens is below the soft limit, then processing continues with INQUIRY 500. At this point, a determination is made as to whether the total token storage level is now below the soft limit, INQUIRY 500. If the token storage level is below the soft limit, then no further processing is performed, STEP 514. However, if the token storage level is not yet below the soft limit, then the aggressiveness of the reclaim level is increased by one, STEP 502. In this example, the reclaim level is now set to two.

Thereafter, a determination is made as to whether the reclaim level is equal to one, INQUIRY 504. Since the reclaim level is now equal to two, processing continues at the next level, STEP 516, which is described with reference to FIG. 5b.

Referring to FIG. 5b, initially, a determination is made as to the value of the reclaim level, INQUIRY 520. Since the reclaim level is equal to two, a further determination is made as to whether the range token level is NOT_LOW, INQUIRY 522. Should the range token level be other than NOT LOW, then processing continues with INQUIRY 500. However, if the range token level is NOT_LOW, then the token server initiates a step that is non-voluntary for one or more client nodes. In particular, in one embodiment, the server acts as a client to reduce the size of one or more large byte range state trees. For example, the server acquires at least one exclusive byte range token from zero to infinity, which causes an invalidation of the cache from token holders.

One embodiment of further details associated with reducing the size of one or more byte range trees is described with reference to FIG. 5b. Initially, the biggest range token tree is selected from the file system with the highest use, STEP 524. Then, one or more revoke requests are sent from the token server to the one or more client nodes that have token ranges in the token range tree that is designated for reclaim (e.g., the biggest range token tree), STEP 526. The storage associated with each revoked token range is returned, thus reducing the amount of storage used for range tokens, STEP 528.

Subsequently, a determination is made as to whether the storage for range tokens is below a soft limit set for the range tokens (e.g., 75%), INQUIRY 530. If the storage utilized for the range tokens is not below the soft limit, then processing continues with STEP 524, and the next biggest range token tree is selected from the file system with the highest use. However, if the storage for the range tokens is below the soft limit, then processing continues with INQUIRY 500.

At INQUIRY 500, a determination is made once again as to whether the token storage level is below the soft limit. If the token storage level is still not below the soft limit, then the aggressiveness of the reclaim level is increased by one, STEP 502. Then, a determination is made as to whether the reclaim level is equal to one, INQUIRY 504. Since the reclaim level is now equal to three, processing continues with the next level, STEP 516.

Referring to FIG. 5b, a determination is made as to the value of the reclaim level, INQUIRY 520. Since the reclaim level is not equal to two, processing continues with a third level. At this level, the token server attempts to find additional storage by migrating from its current node to a more suitable node. In order to perform this migration, various steps are performed.

As one example, initially, token server operations are suspended, STEP 532. These operations include, for instance, the requests to the token server by clients to acquire or relinquish tokens. The requests are queued until the new token server is ready for operations.

Thereafter, a determination is made as to the best new node for the token server, STEP 534. This determination is made based on available memory and CPU usage. For example, the amount of available memory and the CPU utilization for each node (or a subset of the nodes) of the environment are obtained. Then, the node with the most memory and the least CPU utilization is selected. If there is no node that meets this criteria, then the node with the most available memory is chosen, as one other example.

Subsequent to selecting the node to receive the token server, the token server is moved to the selected node, STEP 536. For example, the token state information of all of the tokens is copied to the new server. This is possible, since the operations are suspended and no changes are allowed to the token state information in this suspended mode. Once the information is copied, all queued requests that arrived, while it was in suspended mode, are redirected to the new token server, and it is set for normal operation (resuming operation), STEP 538. This redirection is transparent to the client with the exception of some delay. This third level is the last level to be processed in this pass of the logic. Thus, processing associated with reclaiming and/or obtaining storage is complete, in this example.

Returning to FIG. 4, in a further aspect of the present invention, the token server also monitors for underutilization of memory, and performs one or more actions to increase the amount of storage used for token state information. Thus, in one example, at INQUIRY 410, a determination is made as to the level of the token storage, and if the token storage is other than NOT_LOW, then processing continues with FIG. 6.

Initially, a determination is made as to whether the token storage level is LOW, INQUIRY 600. If the token storage level is not LOW, then the token storage level is COMFORTABLE, thus processing is complete, STEP 602. However, if the token storage level is LOW, then a further determination is made as to whether the non-range token level is LOW, INQUIRY 604.

Should the non-range token level not be LOW, then processing is complete, STEP 602. If, however, the non-range token level is LOW, then a determination is made as to an amount (m%) that selected cache sizes are to be increased, STEP 606. In one example, the selected cache sizes are increased by 5%.

Thereafter, a message is sent to the one or more client nodes that use the file system with the lowest storage use to increase their cache sizes by m%, STEP 608. As each client adds files to its cache, it obtains one or more tokens associated with the cache. Thus, the amount of memory utilized to store token state information is increased. This concludes the processing associated with increasing the amount of storage utilized to store token state information.

In a further example, a message is sent to the one or more client nodes that use the one or more file systems with lower storage use. That is, a number of file systems are affected by the increase.

Described in detail above is a capability for monitoring the amount of memory used to store token state information and for performing one or more actions based on the monitoring. The one or more actions to be taken are based, for instance, on the token type and its associated storage level. For example, for range tokens, a high storage level is handled by issuing revoke requests to clients until storage use returns to an acceptable level. For non-range tokens, high storage use conditions are handled by sending messages to client nodes to reduce their cache sizes, thereby reducing their token requirements. Should additional storage be desired, the token server may be migrated to another node with more memory.

As a further example, for non-range tokens, low storage use conditions are handled by sending messages to client nodes to increase their cache sizes.

In the embodiments described above, reference is made to file systems having the highest/lowest storage use. However, in further embodiments, it is not necessary to select the system with the highest/lowest use. Other selections may be made. For example, a file system with a high/low, but not necessarily the highest/lowest, use may be selected.

Further, for range tokens, the biggest range token tree is selected. Again, in other embodiments, other selections may be made. For instance, a large, but not necessarily the largest, tree may be selected.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing memory utilized in storing token state information, said method comprising:
   actively monitoring by a token server of a communications environment usage of memory employed by the token server in storing token state information associated with tokens managed by the token server to coordinate access to one or more shared resources by clients of the communications environment, at least some of the tokens managed by the token server being held by one or more clients, and wherein the token state information stored by the token server in said memory comprises a token type for each of said at least some tokens being held by said one or more clients and which tokens are held by which clients; and
   performing at least one action in response to said monitoring, said at least one action being initiated by the token server, and being based on an amount of memory employed by the token server in storing the token state information, and a token type(s) of said at least some tokens managed by the token server and held by the one or more clients.

2. The method of claim 1, wherein said monitoring indicates that at least a portion of the memory utilized to store token state information is to be reclaimed.

3. The method of claim 2, wherein said performing at least one action comprises having one or more clients relinquish one or more tokens.

4. The method of claim 3, wherein said having is performed when one or more non-range tokens are utilizing more of the memory than desired.

5. The method of claim 3, wherein the one or more clients to relinquish the one or more tokens use one or more file systems having a high usage of the memory to store token state information.

6. The method of claim 3, wherein the one or more tokens are non-range tokens, and wherein the relinquishing is performed until an amount of the memory used to store state information for non-range tokens is at a predefined level.

7. The method of claim 2, wherein said performing at least one action comprises revoking one or more range tokens of one or more range token trees.

8. The method of claim 7, wherein said revoking is performed when one or more range tokens are utilizing more of the memory than desired.

9. The method of claim 7, wherein the revoking comprises revoking the one or more range tokens from one or more file systems having a high usage of the memory to store token state information.

10. The method of claim 9, wherein the one or more range token trees are selected based on their size.

11. The method of claim 7, wherein said revoking is performed until an amount of the memory used to store state information for range tokens is at a specified level.

12. The method of claim 1, wherein said performing at least one action comprises migrating the token server from a node of the communications environment to another node of the communications environment.

13. The method of claim 1, wherein said performing at least one action comprises performing one or more of the following actions:
  having one or more clients relinquish one or more tokens, in response to an indication that non-range tokens are utilizing more of the memory than desired;
  revoking one or more range tokens, in response to an indication that range tokens are utilizing more of the memory than desired; and
  migrating the token server from a node of the communications environment to another node of the communications environment, in response to an indication that even after the relinquishing and the revoking more available memory is desired.

14. The method of claim 13, wherein the revoking is performed, when the relinquishing of the one or more tokens does not reclaim a desired amount of the memory.

15. The method of claim 1, wherein said monitoring indicates that additional memory is available for storing token state information.

16. The method of claim 15, wherein said performing at least one action comprises informing one or more clients that additional memory is available to store token state information.

17. The method of claim 16, wherein said informing comprises sending a message to the one or more clients informing each client of the one or more clients to increase its cache size by a predefined amount.

18. The method of claim 16, wherein the one or more clients to be informed use one or more file systems having a low usage of the memory to store token state information.

19. The method of claim 1, wherein the at least one action to be performed is selected based on at least one of whether the monitoring indicates that too much or too little memory is being utilized to store token state information and a type of token affecting the memory usage.

20. The method of claim 1, wherein the performing of at least one action comprises performing a plurality of actions in a defined order, in which the defined order represents an increase in aggressiveness.

21. The method of claim 1, wherein the actively monitoring and the performing further comprise:
  checking an amount of memory being utilized to store token state information for each type of token;
  setting an indication characterizing the amount of storage being utilized for each token type;
  saving pointers to one or more file systems with a highest amount of storage utilized to store token state information of at least one token type;
  determining a total level of memory usage by the token server in storing the token state information;
  setting an indication of the total level of memory usage to store the token state information; and
  employing the total level of memory usage employed by the token server in storing the token state information and deciding based thereon when to proceed with the performing at least one action in response to said monitoring.

22. The method of claim 21, further comprising determining that the total level of memory usage employed in storing the token state information is high, and automatically proceeding to awake a separate processing thread to drive logic used to reclaim storage or obtain additional storage for the token state information, wherein once started, the separate thread takes action based on the type of token state information stored, and the associated storage level of each token type.

23. The method of claim 22, wherein aggressiveness of the reclaiming procedure is automatically adjusted based upon the total level of memory usage employed by the token server in storing the token state information.

24. The method of claim 22, wherein the token server actively controls an amount of memory used to store the token state information, and wherein the method is employed by a token-based lock manager which utilizes tokens to coordinate access to shared resources, each token having associated token state information managed by the token-based lock manager, and wherein the token-based lock manager automatically periodically repeats the actively monitoring and the performing.

25. The method of claim 24, further comprising determining whether a non-range token level is low, and if so, increasing selected client cache sizes, wherein as clients of the token server increase cache sizes, one or more tokens associated with the increased cache sizes are obtained, thereby increasing the token state information monitored by the token server and stored in memory.

26. A system of managing memory utilized in storing token state information, said system comprising:
  means for actively monitoring by a token server of a communications environment usage of memory employed by the token server in storing token state information associated with tokens managed by the token server to coordinate access to one or more shared resources by clients of the communications environment, at least some of the tokens managed by the token server being held by one or more clients, and wherein the token state information stored by the token server in said memory comprises a token type for each of said at least some tokens being held by said one or more clients and which tokens are held by which clients; and
  means for performing at least one action in response to said monitoring, said at least one action being initiated by the token server, and being based on an amount of memory employed by the token server in storing the token state information, and a token type(s) of said at least some tokens managed by the token server and held by the one or more clients.

27. The system of claim 26, wherein said means for monitoring indicates that at least a portion of the memory utilized to store token state information is to be reclaimed.

28. The system of claim 27, wherein said means for performing at least one action comprises means for having one or more clients relinquish one or more tokens.

29. The system of claim 28, wherein the having is performed when one or more non-range tokens are utilizing more of the memory than desired.

30. The system of claim 28, wherein the one or more clients to relinquish the one or more tokens use one or more file systems having a high usage of the memory to store token state information.

31. The system of claim 28, wherein the one or more tokens are non-range tokens, and wherein the relinquishing is performed until an amount of the memory used to store state information for non-range tokens is at a predefined level.

32. The system of claim 27, wherein the performing at least one action comprises means for revoking one or more range tokens of one or more range token trees.

33. The system of claim 32, wherein the revoking is performed when one or more range tokens are utilizing more of the memory than desired.

34. The system of claim 32, wherein the means for revoking comprises means for revoking the one or more range tokens from one or more file systems having a high usage of the memory to store token state information.

35. The system of claim 34, wherein the one or more range token trees are selected based on their size.

36. The system of claim 32, wherein the revoking is performed until an amount of the memory used to store state information for range tokens is at a specified level.

37. The system of claim 26, wherein said means for performing at least one action comprises means for migrating the token server from a node of the communications environment to another node of the communications environment.

38. The system of claim 26, wherein said means for performing at least one action comprises means for performing one or more of the following actions:
   having one or more clients relinquish one or more tokens, in response to an indication that non-range tokens are utilizing more of the memory than desired;
   revoking one or more range tokens, in response to an indication that range tokens are utilizing more of the memory than desired; and
   migrating the token server from a node of the communications environment to another node of the communications environment, in response to an indication that even after the relinquishing and the revoking more available memory is desired.

39. The system of claim 38, wherein the revoking is performed, when the relinquishing of the one or more tokens does not reclaim a desired amount of the memory.

40. The system of claim 26, wherein said means for monitoring indicates that additional memory is available for storing token state information.

41. The system of claim 40, wherein said means for performing at least one action comprises means for informing one or more clients that additional memory is available to store token state information.

42. The system of claim 41, wherein said means for informing comprises means for sending a message to the one or more clients informing each client of the one or more clients to increase its cache size by a predefined amount.

43. The system of claim 41, wherein the one or more clients to be informed use one or more file systems having a low usage of the memory to store token state information.

44. The system of claim 26, wherein the at least one action to be performed is selected based on at least one of whether the monitoring indicates that too much or too little memory is being utilized to store token state information and a type of token affecting the memory usage.

45. The system of claim 26, wherein the means for performing at least one action comprises means for performing a plurality of actions in a defined order, in which the defined order represents an increase in aggressiveness.

46. A system of managing memory utilized in storing token state information, said system comprising:
   a token server adapted to actively monitor usage of memory employed by the token server in storing token state information associated with tokens managed by the token server to coordinate access to one or more shared resources by clients of the communications environment, at least some of the tokens managed by the token server being held by one or more clients, and wherein the token state information stored by the token server in said memory comprises a token type for each of said at least some tokens being held by said one or more clients and which tokens are held by which clients; and
   said token server further adapted to initiate and perform at least one action in response to the monitoring, said at least one action being based on an amount of memory employed by the token server in storing the token state information, and a token type(s) of said at least some tokens managed by the token server and held by the one or more clients.

47. At least one program storage device readable by a machine, tangibly embodying at least one program of instructions executable by the machine to perform a method of managing memory utilized in storing token state information, said method comprising:
   actively monitoring by a token server of a communications environment usage of memory employed by the token server in storing token state information associated with tokens managed by the token server to coordinate access to one or more shared resources by clients of the communications environment, at least some of the tokens managed by the token server being held by one or more clients, and wherein the token state information stored by the token server in said memory comprises a token type for each of said at least some tokens being held by said one or more clients and which tokens are held by which clients; and
   performing at least one action in response to said monitoring, said at least one action being initiated by the token server, and being based on an amount of memory employed by the token server in storing the token state information, and a token type(s) of said at least some tokens managed by the token server and held by the one or more clients.

48. The at least one program storage device of claim 47, wherein said monitoring indicates that at least a portion of the memory utilized to store token state information is to be reclaimed.

49. The at least one program storage device of claim 48, wherein said performing at least one action comprises having one or more clients relinquish one or more tokens.

50. The at least one program storage device of claim 49, wherein said having is performed when one or more non-range tokens are utilizing more of the memory than desired.

51. The at least one program storage device of claim 49, wherein the one or more clients to relinquish the one or more tokens use one or more file systems having a high usage of the memory to store token state information.

52. The at least one program storage device of claim 49, wherein the one or more tokens are non-range tokens, and wherein the relinquishing is performed until an amount of the memory used to store state information for non-range tokens is at a predefined level.

53. The at least one program storage device of claim 48, wherein said performing at least one action comprises revoking one or more range tokens of one or more range token trees.

54. The at least one program storage device of claim 53, wherein said revoking is performed when one or more range tokens are utilizing more of the memory than desired.

55. The at least one program storage device of claim 53, wherein the revoking comprises revoking the one or more range tokens from one or more file systems having a high usage of the memory to store token state information.

56. The at least one program storage device of claim 55, wherein the one or more range token trees are selected based on their size.

57. The at least one program storage device of claim 53, wherein said revoking is performed until an amount of the memory used to store state information for range tokens is at a specified level.

58. The at least one program storage device of claim 47, wherein said performing at least one action comprises migrating the token server from a node of the communications environment to another node of the communications environment.

59. The at least one program storage device of claim 47, wherein said performing at least one action comprises performing one or more of the following actions:

- having one or more clients relinquish one or more tokens, in response to an indication that non-range tokens are utilizing more of the memory than desired;
- revoking one or more range tokens, in response to an indication that range tokens are utilizing more of the memory than desired; and
- migrating the token server from a node of the communications environment to another node of the communications environment, in response to an indication that even after the relinquishing and the revoking more available memory is desired.

60. The at least one program storage device of claim 59, wherein the revoking is performed, when the relinquishing of the one or more tokens does not reclaim a desired amount of the memory.

61. The at least one program storage device of claim 47, wherein said monitoring indicates that additional memory is available for storing token state information.

62. The at least one program storage device of claim 61, wherein said performing at least one action comprises informing one or more clients that additional memory is available to store token state information.

63. The at least one program storage device of claim 62, wherein said informing comprises sending a message to the one or more clients informing each client of the one or more clients to increase its cache size by a predefined amount.

64. The at least one program storage device of claim 62, wherein the one or more clients to be informed use one or more file systems having a low usage of the memory to store token state information.

65. The at least one program storage device of claim 47, wherein the at least one action to be performed is selected based on at least one of whether the monitoring indicates that too much or too little memory is being utilized to store token state information and a type of token affecting the memory usage.

66. The at least one program storage device of claim 47, wherein the performing of at least one action comprises performing a plurality of actions in a defined order, in which the defined order represents an increase in aggressiveness.

* * * * *